United States Patent [19]
Tiede

[11] 3,910,556
[45] Oct. 7, 1975

[54] GROUND ROD DRIVING DEVICE
[76] Inventor: Ray E. Tiede, Rural Rte. 1, Box 180, Great Bend, Kans. 67530
[22] Filed: June 10, 1974
[21] Appl. No.: 477,684

[52] U.S. Cl............................. 254/29 R; 254/29 R
[51] Int. Cl.² ........................................ E21B 19/00
[58] Field of Search.................... 254/29 R; 61/53.5

[56] References Cited
UNITED STATES PATENTS
| 1,264,993 | 5/1918 | Strohacker....................... 254/29 R |
| 2,402,393 | 6/1946 | Griffith ............................ 254/29 R |
| 2,435,651 | 2/1948 | Huber .............................. 254/29 R |
| 2,742,258 | 4/1956 | Rosasco ........................... 254/29 R |

Primary Examiner—Al Lawrence Smith
Assistant Examiner—Robert C. Watson
Attorney, Agent, or Firm—Fishburn, Gold & Litman

[57] ABSTRACT

A device for driving a ground rod, stakes, marker posts, and the like, is mounted on a boom of a mobile power unit operative to selectively exert a downward pressure on one end of the boom and on a ground rod driving member having a head portion mounted on the one end of the boom and a rod receiving portion depending from the head portion and received in a guide portion of a guide member having a ground engaging base with an aperture therein to permit a ground rod and the rod receiving portion of the rod driving member to extend therethrough. The rod receiving portion of the rod driving member has a plurality of longitudinally spaced apertures therein each adapted to receive an abutment removably mounted in a selected one of the apertures for engaging an upper end of the ground rod for selective extent of ground rod in the driving member.

4 Claims, 5 Drawing Figures

U.S. Patent   Oct. 7, 1975   3,910,556
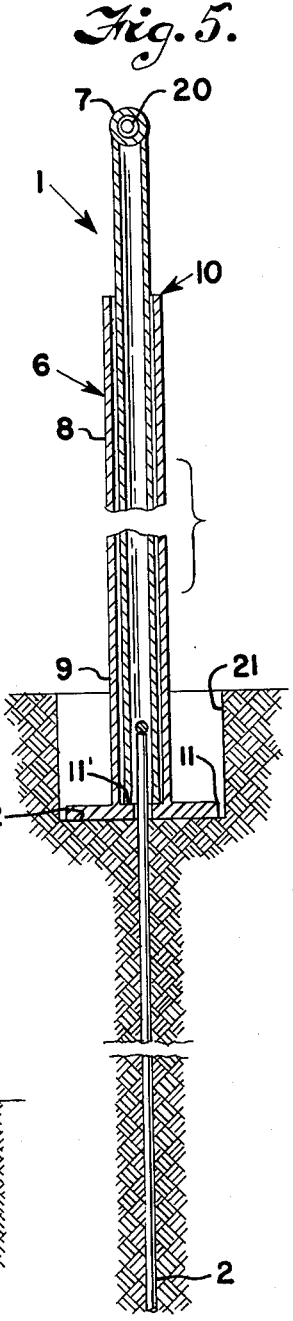

GROUND ROD DRIVING DEVICE

The present invention relates to ground rod driving devices and more particularly to a ground rod driving device mounted on a boom of a mobile power unit operative to drive the ground rod into the ground in steps.

The principle objects of the present invention are: to provide a ground rod driving device constructed to be mounted on a boom of a mobile power unit operative to selectively exert downward pressure on a driving member of the ground rod driving device; to provide such a ground rod driving device for driving a ground rod in steps whereby the free end of the boom has a minimum of vertical movement for each step; to provide such a rod driving device which is versatile in use and is adapted to drive telephone ground rods, power ground rods, sign posts, fence posts, and like elongate members into the ground; to provide such a rod driving device adapted to provide lateral support for the ground rod during driving thereof; and to provide such a ground rod driving device which is safe in use, economical to manufacture, durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the ground rod driving device.

FIG. 1 is a side elevational view of a mobile power unit and a ground rod driving device embodying features of the present invention.

FIG. 2 is an enlarged front elevational view of the ground rod driving device.

FIG. 3 is an enlarged longitudinal sectional view taken on line 3—3, FIG. 2 and showing components of the ground rod driving device in an initial driving position.

FIG. 4 is an enlarged longitudinal sectional view similar to FIG. 3 except showing components of the ground rod driving device in an intermediate driving position.

FIG. 5 is an enlarged longitudinal sectional view similar to FIG. 3 except showing components of the ground rod driving device in final driving position.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously enploy the present invention in virtually any appropriately detailed structure.

In the disclosed embodiment of the present invention, the reference numeral 1 generally designates a ground rod driving device for driving a ground rod 2. The ground rod driving device 1 is connected to a boom 3 or the like of a mobile power unit 4 which is operative to selectively exert a downward pressure on one end 5 of the boom 3 and on a ground rod 2 received in a ground rod driving member 6 having a head portion 7 mounted on the one end 5 of the boom 3 and a rod receiving portion 8 depending from the head portion 7 and received in a guide portion 9 of a guide member 10 having a ground engaging base 11 with portions 11' inwardly of the guide portion 9, said portion 11' having an aperture 12 therein to permit a ground rod 2 to extend therethrough and form a stop for the rod driving member 6. The rod receiving portion 8 of the rod driving member 6 has a plurality of longitudinally spaced apertures 14 therein each adapted to receive an abutment 15 removably mounted in a selected one of the apertures 14 for engaging an upper end of the ground rod 2 whereby downward pressure on the driving member 6 exerts downward pressure on the ground rod 2.

The ground rod 2 may be used to ground either an electrical power system or a telephone system and may be of any suitable construction. Ground rods are preferably constructed of a steel core for strength and coated with a good electrically conductive metal, such as copper.

The mobile power unit 4 may be any suitable structure including various structure used for moving and setting poles and the like which is maneuverable to position the ground rod driving device 1 in a desired location. The mobile power unit 4 has a suitable frame and preferably has suitable front and rear ground engaging wheels 16. The mobile power unit 4 is operative to exert a downward pressure on the one end 5 of the boom 3 in any suitable manner, such as by cables, gears, and the like. The boom 3 is illustrated as an elongated member and is generally horizontal when in position for driving a ground rod 2.

The one end 5 of the boom 3 may be any suitable structure adapted to have the head portion 7 of the rod driving member 6 mounted thereon. In the illustrated structure, the one end 5 of the boom 3 has laterally spaced ears 17 and 18 which each have a plurality of apertures 19 therein. The apertures 19 are vertically spaced in each of the ears 17 and 18 and are arranged in laterally aligned pairs.

The ground rod driving member 6 is mounted on the one end 5 of the boom 3 and is engageable with an upper end of the ground rod 2 to thereby exert downward pressure on the ground rod 2 and thereby drive same a selected distance into a ground surface. The head portion 7 of the rod driving member 6 is illustrated as a tubular member adapted to receive an elongated fastening member 20, such as a bolt or pin, extending through a selected one of the aligned pairs of apertures 19 and the head portion 7 to pivotally mount same on the one end 5 of the boom 3. The head portion 7 may be modified, as by being formed as a yoke, to mount on other forms of the boom, such as booms not having projecting ears.

The rod receiving portion 8 of the rod driving member 6 is an elongated tubular member mounted on the head portion 7 and extending therefrom. The rod receiving portion is substantially normal or perpendicular to the head portion 7 whereby a wall of the head portion 7 closes one end of the tubular rod receiving portion 8 and thereby defines an abutment to be engaged by an upper end of the ground rod 2 at the start of the rod driving operation.

The rod receiving portion 8 is illustrated as cylindrical to receive an elongated round rod, however, the portion 8 of the driving member 6 may have any desired cross-section to conform to the shape of a member being driven, such as highway markers, non-round sign posts, and the like and have supporting engagement therewith for the length in the portion 8.

The tubular rod receiving portion 8 of the rod driving member 6 has a plurality of the longitudinally spaced apertures 14 therein each adapted to receive therein the abutment 15 whereby the abutment 15 is positioned to engage the upper end of the ground rod 2. The abutment 15 is removably mounted in a selected one of the apertures 14 and is moved for each driving movement of the boom 3.

The guide member 10 is positioned with the base 11 in a selected position thereby designating the position of the ground rod. The base 11 is illustrated as a planar membe having the aperture 12 therethrough and sized to permit the ground rod 2 to extend therethrough with the plate portions 11' serving as a stop for the rod receiving portion 8. The guide portion 9 of the guide member 10 is an elongated tubular member extending upwardly from the ground engaging base 11 and is sized to receive therein the rod receiving portion 8 and to permit longitudinal movement of the rod receiving portion 8 within the guide portion 9.

In using a ground rod driving device constructed as illustrated and described, the head portion 7 of the rod driving member 6 is mounted on the one end 5 of the boom 3 by means of the fastening member 20. At the desired location of a rod 2, a hole 21 is dug to a suitable depth to receive the base 11 and permit the rod 2 to be driven to a position with its upper end below the ground level. The guide member 10 is positioned in the hole 21 with the base 11 resting on the bottom 22 of the hole and the aperture 12 in the base 11 defining the location of the ground rod 2 which is then positioned within the guide portion 9 of the guide member 10. The mobile power unit 4 is maneuvered into position having the rod receiving portion 8 positioned above and aligned with the guide portion 9 of the guide member 10. The rod receiving portion 8 is moved into the guide portion 9 and the end 5 of the boom 3 is lowered until the upper end of the ground rod 2 engages the wall of the head portion 7. The end 5 of the boom 3 is then lowered a selected distance whereby the wall of the head portion 7 exerts a downward pressure on the upper end of the rod 2, thereby driving a lower end portion of the ground rod 2 into the ground a distance substantially equal to the movement of the end 5 of the boom 3, the portion 11' of the base is a stop to limit downward movement of the driving member 6. The boom 3 is then raised to permit the abutment 15 to be placed in the upper aperture 14 in the rod receiving portion 8 of the rod driving member 6. The end 5 of the boom 3 is again lowered with the abutment 15 in engagement with the upper end of the ground rod 2 thereby driving the lower end portion of the ground rod 2 farther into the ground. The boom 3 is again raised and the abutment 15 is moved to a lower aperture 14 and the one end 5 of the boom 3 is lowered a substantially equal distance again driving the rod 2 into the ground and the process is repeated until the upper end of the ground rod 2 is positioned approximately one foot below the top of the ground surface.

It is to be understood that while I have illustrated and described one form of my invention, it is not be limited to the specific form or arrangement of parts herein described and shown.

What I desire to claim and secure by Letters Patent is:

1. A ground rod driving apparatus for use with a mobile unit having a pivoted elongate boom with a free end and power means for swinging said boom to move said free end above and below a horizontal line, said driving apparatus comprising:
   a. a driving member having a head portion and an elongate portion depending from said head portion, said elongate portion having a lower end and a ground rod receiving bore open at said lower end and extending longitudinally of said elongate portion substantially to said head portion, said head being pivotally connected to the free end of the boom whereby said elongate portion depends therefrom;
   b. a guide member having a base adapted to rest on a ground surface and an upright guide portion having an open upper end and a lower end fixed to said base, said guide portion having a guide passage longitudinally thereof for reciprocably receiving said elongate portion of the drive member;
   c. said base having a rod guiding aperture therethrough substantially axially of said guide passage;
   d. said elongate portion of the drive member having a plurality of longitudinally spaced apart apertures extending transversely thereof and intersecting said rod receiving bore;
   e. an abutment member removably mounted in selected transverse apertures for engaging an upper end of a ground rod positioned in the bore and extending through the guiding aperture in said base portion for driving the ground rod in response to downward movement of the boom.

2. A ground rod driving apparatus as set forth in claim 1 wherein:
   a. said guide portion of said guide member comprises an elongated tubular member and the guide passage is a bore adapted to receive therein said elongate portion of the driving member; and
   said guide aperture in said base is smaller than said passage and the base portion between the elongated member and the guide aperture is a stop limiting downward movement of said driving member within said guide member.

3. A ground rod driving apparatus as set forth in claim 2 wherein said bore in the elongate rod receiving portion of said driving member has a closed end adjacent said head portion providing an abutment engaged by the upper end of the rod-like member for a first driving movement of said boom.

4. A ground rod driving apparatus as set forth in claim 3 wherein:
   a. said base portion is adapted to rest on a surface at a level below the ground top surface;
   b. the lower-most transverse aperture has a spacing from the lower end of the elongate portion of the driving member less than the depth of the base portion and thereby is below the ground top surface when said lower end of the elongate portion of the driving member engages said stop;
   c. said abutment member being movable to transverse apertures located progressively downwardly of said elongate portion of the driving member for a step-by-step driving of the ground rod into the ground until the abutment member is in the lower-most transverse aperture and is below the ground top surface.

* * * * *